F. J. ONAR.
MOTORCYCLE.
APPLICATION FILED JAN. 3, 1920.

1,343,788.

Patented June 15, 1920.
3 SHEETS—SHEET 1.

Inventor
F. J. Onar,
By
Attorney

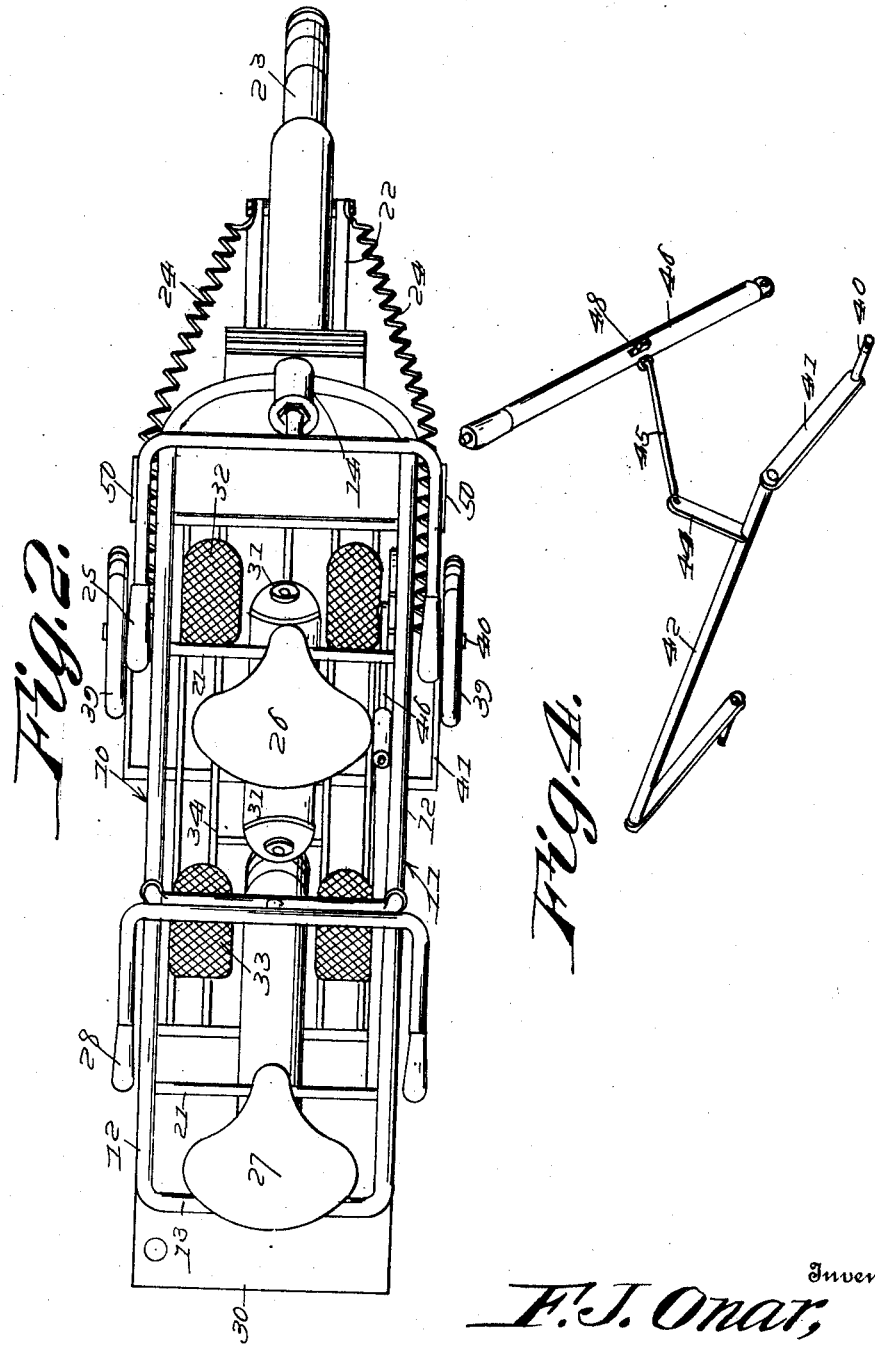

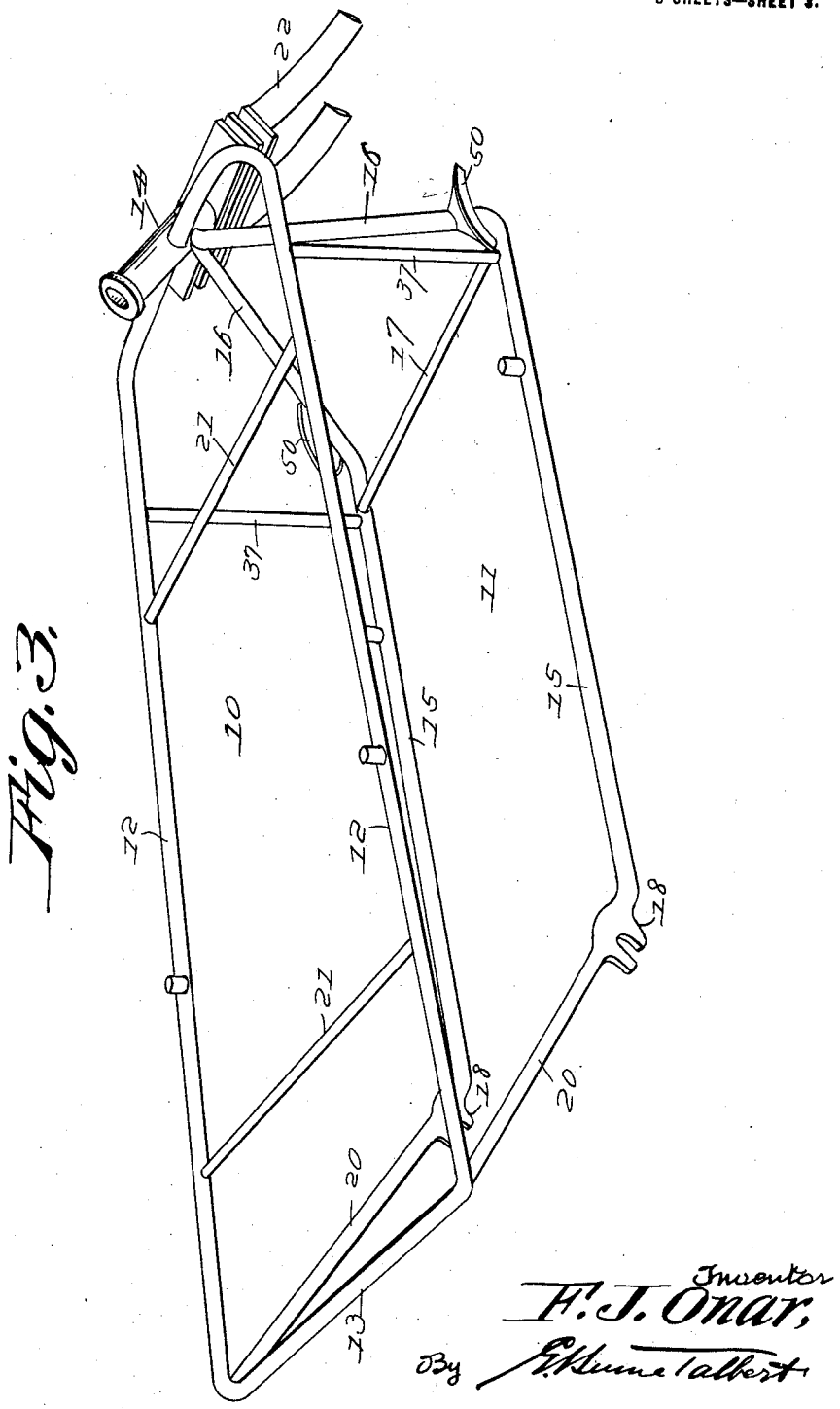

UNITED STATES PATENT OFFICE.

FASIFFO J. ONAR, OF COUNCIL, ARKANSAS.

MOTORCYCLE.

1,343,788. Specification of Letters Patent. Patented June 15, 1920.

Application filed January 3, 1920. Serial No. 349,274.

*To all whom it may concern:*

Be it known that I, FASIFFO J. ONAR, a citizen of the United States of America, residing at Council, in the county of Lee and State of Arkansas, have invented new and useful Improvements in Motorcycles, of which the following is a specification.

The object of the invention is to provide a construction of motorcycle which is adapted for carrying luggage or the equivalent thereof under such conditions as to provide for the transportation of the maximum load with the least inconvenience to the occupant or occupants of the vehicle particularly in the matter of balance and in reference to the operation of the machine, and in that connection to provide auxiliary supporting devices adapted for optional use as the occasion may require under the control of the operator, the mounting and location of such auxiliary supporting means being such as to adapt the same for maintaining the vehicle in an upright or normal position when unoccupied or when not in movement and during the starting thereof, and to this end the invention consists in a construction, combination and relation of parts of which a preferred embodiment is shown in the accompanying drawing, wherein:

Fig. 2 is a plan view of the same.

Fig. 3 is a perspective view of the frame.

Fig. 4 is a similar view of the means for mounting the auxiliary supporting elements.

Figure 1:
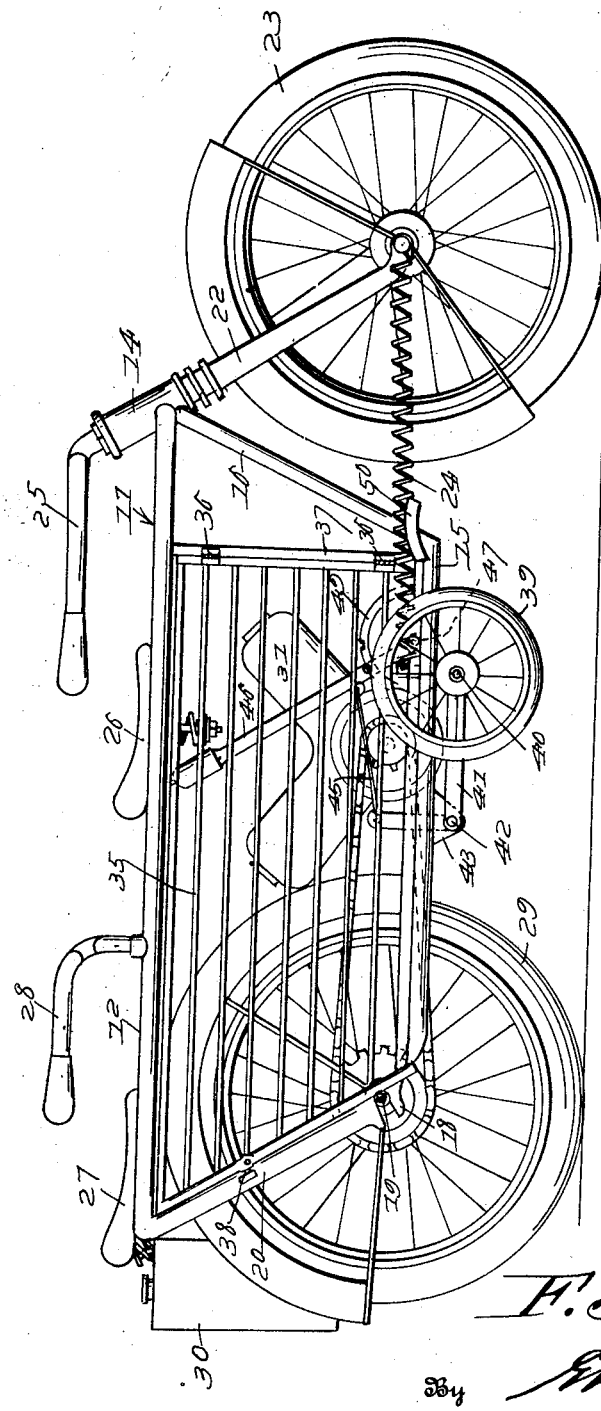
Figure 1 is a side view of the machine.

The frame consists essentially of the upper and lower substantially parallel members 10 and 11 of which the former consists of side bars 12 connected at their rear ends by a cross bar 13 and connected at their forward ends to the head 14, said side and rear bars if preferred and as shown, conconsisting of a single continuous tubular element. The lower member of the frame consists of side bars 15 having upwardly and forwardly convergent extensions 16 also connected with the head 14 and joined transversely by a brace 17, the rear ends of said side bars having the bearing notches 18 for the driving wheel axle 19, and being connected with the rear portion of the main or upper frame member 10 by means of upwardly and rearwardly extending rear braces 20. The side bars of the upper or main frame are also connected by transverse braces 21.

Obviously any preferred construction and arrangement of steering fork 22 may be mounted in the head to carry the steering wheel 23 adapted to be yieldingly held in a centered or alined position by the oppositely disposed counterbalancing springs 24, and moreover that obviously any preferred form of steering handle such as that shown at 25 may be employed to facilitate the control of the driver occupying the seat 26. In the construction illustrated an auxiliary or passenger's seat 27 is arranged near the rear of the frame and adjacent thereto may be located the grips 28 for the convenience of an occupant of said seat.

The drive wheel 29 is located and mounted substantially as in the ordinary practice in the construction of motor vehicles of the motor-vehicle type with the gasolene or fuel tank 30 arranged in rear of the frame above the drive wheel, and the engine 31 located between the front and rear wheels and supported by the lower frame member 11 to which also may be attached front and rear foot rests 32 and 33 convenient respectively to the front and rear seats 26 and 27.

Arranged within the lower frame member and serving as the bottom of the luggage compartment is a grating 34, said compartment being bounded laterally by movable guards 35 preferably consisting of barred gates hinged as at 36 to uprights 37 connecting the upper and lower frame members near their forward ends and provided at their free rear ends with latches 38 for engagement with the rear braces 20, to the end that by opening either of said gates access may be had to the interior of a luggage compartment representing the space bounded vertically by the upper and lower frame members and laterally by said guards or gates and otherwise occupied solely by the engine and the forward portion of the drive wheel. Thus baggage may be arranged in the compartment and packed so as to protect it against contact with outside objects and under such conditions as to avoid loss or displacement while the machine is in motion, and in addition the compartment serves as a means of preventing the surreptitious removal of baggage when the car is not in motion and during the temporary absence of the occupants, it being obvious that the guards or gates may be suitably locked in their closed positions.

As an auxiliary or load support for the luggage-carrying compartment, as when a particularly heavy load is arranged therein or when the machine is at rest or during the starting of the same and until a sufficiently rapid forward movement has been attained to enable the operator to obtain the necessary control, supporting wheels 39 may be employed the same being mounted upon suitable spindles 40 carried by the arms 41 of a swinging frame including a rocker 42 suitably mounted in bearings 43 depending from the lower frame member 11 and having a crank arm 44 connected by a link 45 with an operating lever 46 fulcrumed for convenience at 47 and having a locking pawl 48 for engagement with the notches of a segment 49. The relief or supplemental supporting wheels may thus be lowered and locked in ground-engaging position at either side of the plane of the longitudinal center of the machine to afford additional support for the load carried by the luggage compartment or to maintain the machine in an upright position when at rest, and also to support the machine as above noted during the starting thereof and until a sufficiently rapid forward movement has been attained to enable the operator to secure a proper balance, whereupon they may be raised into a folded position as indicated in Fig. 1 merely by the manipulation of the lever 46 which is within convenient reach of the occupant of the seat 26.

It will be noted that the equalizing or counter-balance springs 24 extend at intermediate points through saddles or rests 50 carried by the lower frame member near its front end, the tendency of said springs being to yieldingly maintain the steering wheel in an intermediate or central position to which it will be returned thereby when the steering handle or other equivalent element is released.

What is claimed is:

1. A vehicle of the type described having upper and lower substantially parallel frame members inclosing a space constituting a luggage compartment and having the steering, driving and supporting members mounted thereon, and side guards bounding said compartment in the intervals between said frame members, one of said guards being movable to give access thereto.

2. A vehicle of the type described having upper and lower substantially parallel frame members inclosing a space forming a luggage compartment provided with a grating bottom in the plane of the lower frame member, steering, driving and supporting members being mounted upon said frame, and side guards bounding said compartment in the planes of the side elements of said frame members, one of said guards being hingedly mounted to give access to the interior of the compartment.

3. A vehicle of the type indicated having upper and lower substantially parallel frame members inclosing a space forming a luggage compartment and provided with side guards or gates of which one is movable to give access thereto, steering, driving and supporting means mounted upon said frame, and auxiliary supporting means located at an intermediate point in the length of the frame and provided with supporting wheels movable vertically with relation to the plane of the frame, and means for securing said supporting wheels in their adjusted positions.

4. A vehicle of the type indicated having a frame consisting of upper and lower substantially parallel members inclosing a space forming a luggage compartment and provided with movable side guards or gates, steering and driving wheels mounted at opposite ends of the frame, and an intermediate auxiliary supporting device mounted upon the frame between said steering and driving wheels and consisting of a rocking frame, auxiliary wheels carried by the rocking frame and adapted for movement vertically with reference to the plane of the main frame, and means for securing the rocking frame in its adjusted positions.

5. A vehicle of the type indicated having a main frame comprising substantially parallel upper and lower members inclosing a space forming a luggage compartment and provided with movable side guards or gates, steering and driving wheels mounted upon the frame at its front and rear ends, and an auxiliary intermediate supporting means consisting of a rocking frame mounted upon the main frame between the steering and driving wheels, auxiliary supporting wheels mounted upon said rocking frame for upward and downward movement in vertical planes at either side of the longitudinal center of the main frame, and means for moving and securing the rocking frame in its adjusted positions.

In testimony whereof I affix my signature.

FASIFFO J. ONAR.